US008767703B2

(12) United States Patent
Jiang

(10) Patent No.: US 8,767,703 B2
(45) Date of Patent: Jul. 1, 2014

(54) ENHANCED POLLING METHOD FOR PREVENTING DEADLOCK IN A WIRELESS COMMUNICATIONS SYSTEM

(75) Inventor: Sam Shiaw-Shiang Jiang, Taipei (TW)

(73) Assignee: Innovative Sonic Limited, Ebene (MU)

( * ) Notice: Subject to any disclaimer, the term of this patent is extended or adjusted under 35 U.S.C. 154(b) by 597 days.

(21) Appl. No.: 12/110,352

(22) Filed: Apr. 28, 2008

(65) Prior Publication Data

US 2008/0205371 A1  Aug. 28, 2008

Related U.S. Application Data

(63) Continuation of application No. 11/161,356, filed on Aug. 1, 2005, now Pat. No. 7,558,243.

(60) Provisional application No. 60/522,324, filed on Sep. 15, 2004.

(51) Int. Cl.
H04J 3/16 (2006.01)
(52) U.S. Cl.
USPC ........... 370/346; 370/324; 370/389; 370/401; 370/412
(58) Field of Classification Search
USPC .................. 370/346, 389, 324, 401, 412
See application file for complete search history.

(56) References Cited

U.S. PATENT DOCUMENTS

2004/0013087 A1  1/2004  Su et al.

FOREIGN PATENT DOCUMENTS

| EP | 1 263 160 A1 | 12/2002 |
| EP | 1 424 815 A1 | 6/2004 |
| JP | 2003-174470 | 6/2003 |
| WO | 0062468 A2 | 10/2000 |
| WO | 02/069547 A1 | 9/2002 |

OTHER PUBLICATIONS

3GPP TS 25.322 V6.1.0, Jun. 1, 2004.
3GPP TS 25.322 V6.1.0 (Jun. 2004) Radio Link Control (RLC) protocol specification.
ASUSTEK: "R2-042255", 3GPP TSG-RAN2 Meeting #44, Oct. 8, 2004, Retrived from the Internet: URL: http://www.3gpp.org/ftp/Specs/html-info/25322-CRs.htm.
NTT DoCoMo, Explanation of RLC retransmission scheme proposed by TTC/ARIB, TSGR2#2(99)155, 3GPP, Mar. 11, 1999, paragraph 3, URL: http://www.3gpp.org/ftp/tsg_ran/WG2_RL2/TSGR2_02/Docs/pdfs/R2-99155.pdf, USA.
"Universal Mobile Telecommunications System (UMTS); Radio Link Control (RLC) protocol specification (3GPP TS 25.322 version 4.10.0 Release 4); ETSI TS 125 322", ETSI Standards, Lis, Sophia Antipolis Cedex, France, vol. 3-R2, No. V4.10.0, Sep. 1, 2003, ISSN: 0000-0001.
Kueh V Y H et al: "Performance Evaluation of Conference Creation Signalling over Satellite UMTS", vol. 4, May 30, 2005, pp. 2663-2667.
3G TS 25.322 Draft V3.1.0 (Dec. 1999).
3GPP TS 25,322 V3,7.0 (Jun. 2001).

(Continued)

Primary Examiner — Tuan Pham
(74) Attorney, Agent, or Firm — Blue Capital Law Firm, P.C.

(57) ABSTRACT

A method of polling in a wireless communications system includes prohibiting polling within a predetermined period and triggering a poll function while polling is prohibited. After the predetermined period has expired the method determines that there are no protocol data units (PDUs) scheduled for transmission or re-transmission and that the poll function was triggered by a "Every Poll_PDU PDU" trigger, and selects a PDU to schedule for re-transmission to fulfill the poll function.

3 Claims, 8 Drawing Sheets

(56) References Cited

OTHER PUBLICATIONS

Email of Oct. 5, 2000 from Hans van der Veen to 3GPP_TSG_RAN_WG2, TSG RAN Working Group2.
Communication of a notice of opposition on related EP Patent Application No. 08012107.2 issued on Mar. 24, 2011.
Communication of a notice of opposition on related EP Patent Application No. 08012130.4 issued on Mar. 24, 2011.
Communication of a notice of opposition on related EP Patent Application No. 08012131.2 issued on Mar. 25, 2011.
Communication of a notice of opposition on related EP Patent Application No. 08012137.9 issued on Mar. 28, 2011.
3GPP TSG-RAN WG2 Meeting #44 Sophia-Antipolis, France, Oct. 4-8, 2004 (R2-042255).
3GPP TS 25.322 V6.1.0 (Jun. 2004).
3GPP TS 25.322 V6.2.0 (Dec. 2004).
Decision revoking the European Patent No. 1973260 dated Aug. 10, 2012.

ENHANCED POLLING METHOD FOR PREVENTING DEADLOCK IN A WIRELESS COMMUNICATIONS SYSTEM

CROSS REFERENCE TO RELATED APPLICATIONS

This is a continuation application of application Ser. No. 11/161,356, filed Aug. 1, 2005, which claims the benefit of U.S. Provisional Application No. 60/522,324, filed on Sep. 15, 2004, the contents of which are incorporated herein by reference.

BACKGROUND OF THE INVENTION

1. Field of the Invention

The present invention relates to wireless communications. More particularly, the present invention relates to an enhanced polling mechanism and device in a 3GPP wireless communications system.

2. Description of the Prior Art

The surge in public demand for wireless communication devices has placed pressure upon industry to develop increasingly sophisticated communications standards. The $3^{rd}$ Generation Partnership Project (3GPP™) is an example of such a new communications protocol. The 3rd Generation Partnership Project (3GPP) specification, 25.322 V6.1.0 (2004-06) Radio Link Control (RLC) protocol specification (referred to hereinafter as 3GPP TS 25.322), included herein by reference, provides a technical description of a Universal Mobile Telecommunications System (UMTS), and data transmission control protocols thereof.

These standards utilize a three-layer approach to communications. Please refer to FIG. 1. FIG. 1 is a block diagram of three layers in such a communications protocol. In a typical wireless environment, a first station 10 is in wireless communications with one or more second stations 20. An application 13 on the first station 10 composes a message 11 and has it delivered to the second station 20 by passing the message 11 to a layer-3 interface 12. The layer-3 interface 12 may also generate some layer-3 signaling messages 14 for the purpose of controlling layer-3 operations. The layer-3 interface 12 delivers either the message 11 or the layer-3 signaling message 14 to a layer-2 interface 16 in the form of layer-2 service data units (SDUs) 15. The layer-2 SDUs 15 may be of any length. The layer-2 interface 16 composes the SDUs 15 into one or more layer-2 protocol data unit(s) (PDU) 17. Each layer-2 PDU 17 is of a fixed length, and is delivered to a layer-1 interface 18. (The required length of PDUs within a given communications system is dictated by the RLC layer of a transmitting station in accordance with above cited reference.) The layer-1 interface 18 is the physical layer, transmitting data to the second station 20. The transmitted data is received by the layer-1 interface 28 of the second station 20 and reconstructed into one or more PDUs 27, which is/are passed up to the layer-2 interface 26. The layer-2 interface 26 receives the PDUs 27 and builds up one or more layer-2 SDU(s) 25 from the PDUs 27. The layer-2 SDUs 25 are passed up to the layer-3 interface 22. The layer-3 interface 22, in turn, converts the layer-2 SDUs 25 back into either a message 21, which should be identical to the original message 11 that was generated by the application 13 on the first station 10, or a layer-3 signaling message 24, which should be identical to the original signaling message 14 generated by the layer-3 interface 12, and which is then processed by the layer-3 interface 22. The received message 21 is passed up to an application 23 on the second station 20. (As a note regarding terminology used throughout this disclosure, a PDU is a data unit that is used by a layer internally to transmit to, and/or receive from, a lower layer, whereas an SDU is a data unit that is passed up to, and/or received from, an upper layer.)

There are three possible data transmission modes falling under the auspices of the abovementioned protocol specification, transparent mode (TM), acknowledged mode (AM) and unacknowledged mode (UM). As the present invention relates only to AM transmission, the scope of the prior art discussion herein is therefore limited to background relevant to AM transmission.

Acknowledged Mode transmission is so called because a transmitting station requires acknowledgement from a receiving station, confirming that a message or part of a message has been successfully received. Based upon such information returned from the receiving station, the transmitting station either continues to transmit further packetized data as described above, or retransmits unconfirmed portions of previously transmitted data. The extra effort required to employ this transmission mode carries an additional overhead in terms of transmission airtime and system requirements. The RLC layer of the transmitting station therefore minimizes the impact of the abovementioned overhead. This is managed by carefully controlling the number of requests made to the receiving station for confirmation messages, i.e. status reports. Status reports are requested, or 'polled', by the transmitting station setting a poll bit in the header of a protocol data unit (PDU) to be transmitted. Please refer to FIG. 2. FIG. 2 is a block diagram showing the make-up of an acknowledged mode data (AMD) PDU 30. The AMD PDU 30 comprises a predefined number of octets, i.e. 8-bit binary words, as each AMD PDU within a given communications system is of a fixed length as mentioned above. The first octet 31 of the AMD PDU 30 is composed of a data/control (D/C) bit 310, this being used to indicate the PDU type, i.e. either 'data' or 'control', and the first seven bits of the twelve-bit PDU sequence number (SN) 311. The second octet 32, is composed of five further bits of the SN 320, the poll bit 321, and the header extension (HE) bits 322. The twelve-bit SN is used by receiving stations to accurately re-construct original messages from received PDUs, while the HE bits (there are two) are used to indicate whether the following octet, i.e. the third octet 33, is a data byte or a length indicator (LI) with extension bit. In the example AMD PDU 30 shown, the third octet 33 is an LI 330 with an extension bit 331; the LI 330 is used to map the position within the PDU 30 of the last byte of an SDU contained in the data block 35. More than one LI may be included in an AMD PDU, therefore the extension bit 331, is included to indicate whether the following octet is a data byte or another LI with extension bit. Hence there may be a number of LIs between the first LI 330 and the last LI 340. Because each PDU must conform to a predefined length, the PDU 30 may not be foreshortened even if there is insufficient data 35 to completely fill the required number of octets, hence padding 36 is inserted into the remaining octets.

Of particular relevance is the poll bit 321, which is used to prompt the receiving station to reply with a status report upon successful receipt of any PDU in which the poll bit is set. Please refer to FIG. 3, which shows a message sequence chart representing AMD PDU transfer between a transmitting station 41 and a receiving station 42, in a communications system 40 utilizing a 3-layer protocol as outlined above. A string of PDUs 400-405 are transmitted sequentially from the transmitting station 41 to the receiving station 42, the last PDU 405 being sent with poll bit set. Upon receiving the PDU 405, the receiving station 42 responds by transmitting a status report 406 back to the transmitting station 41.

The designation of PDUs to be transmitted with poll bit set, is derived from the upper layers of each RLC entity in accordance with the cited protocol specification. The communications systems discussed herein can be configured to trigger a poll when any of the following events occur:

1) The last PDU in the (first time) transmission buffer is transmitted.

2) The last PDU in the re-transmission buffer is transmitted.

3) Upon time-out of a 'Poll_Timer' function (triggers a poll function when a predefined period of time has elapsed following the initiation of a poll being sent out).

4) An 'Every Poll_PDU' PDU is transmitted (triggers a poll function each time a predefined number of PDUs have been scheduled for transmission or retransmission).

5) An 'Every Poll_SDU' SDU is transmitted (triggers a poll function each time a predefined number of SDUs have been scheduled for transmission).

6) Conditions required by the 'Poll_Window' function are fulfilled (i.e. a "Window based trigger" is issued, which triggers a poll function when a predefined percentage of a transmission window has been reached).

7) A predefined time period expires, i.e. a "timer based" function is configured (triggers a poll periodically).

In addition to the above, the upper layers may configure a timer called 'Timer_Poll_Prohibit', which is then used to prohibit the transmission of polls within a predetermined period. If another poll is triggered while polling is prohibited by a current Timer_Poll_Prohibit function, transmission of the poll is delayed until Timer_Poll_Prohibit expires. Even if several polls were triggered while Timer_Poll_Prohibit was active, only one poll is transmitted when Timer_Poll_Prohibit expires.

The polling process of the prior art set forth by 3GPP TS 25.322 can be summarized as the flow diagram shown in FIG. 4:

Step 1000: Process starts.

Step 1001: The system checks if there is a new PDU to be transmitted. If there is, the process proceeds to Step 1010. Otherwise, the process proceeds to Step 1002.

Step 1002: The system checks if there is negatively acknowledged PDU to be retransmitted. If there is, the process proceeds to Step 1011. Otherwise, the process proceeds to Step 1003.

Step 1003: The system checks if a polling function has been triggered. If yes, the process proceeds to Step 1004. Otherwise, the process terminates via Step 1017.

Step 1004: The system checks if polling is prohibited. If polling is not prohibited, the process proceeds to Step 1005. Otherwise, the process terminates via Step 1017.

Step 1005: A polling function is activated and the polling bit of the next PDU to be transmitted is set to 1.

Step 1006: The system checks if there is no PDU scheduled for transmission or retransmission. If the checking result is yes, the process proceeds to Step 1007. Otherwise, the process terminates via Step 1017.

Step 1007: The system checks if the polling function checked at Step 1003 was triggered by "Poll timer" or "Timer based". If yes, the process proceeds to Step 1008. Otherwise, the process terminates via Step 1017.

Step 1008: The system selects a suitable PDU for retransmission to carry the poll.

Step 1009: The system schedules the selected PDU for transmission. The process proceeds to Step 1016.

Step 1010: The system schedules the new PDU for transmission. The process proceeds to Step 1012.

Step 1011: The system schedules the negatively acknowledged (NACKed) PDU for retransmission.

Step 1012: The system checks if a polling function has been triggered. If yes, the process proceeds to Step 1013. Otherwise, the process proceeds to Step 1015.

Step 1013: The system checks if polling is prohibited. If polling is prohibited, the process proceeds to Step 1015. Otherwise, the process proceeds to Step 1014.

Step 1014: A polling function is activated and the polling bit of the next PDU to be transmitted is set to 1.

Step 1015: Polling function is not activated and the polling bit of the next PDU to be transmitted is set to 0.

Step 1016: The system submits the PDU to lower layer for transmission.

Step 1017: Process ends.

Please refer to FIG. 5, which illustrates the above features via a similar message sequence chart to FIG. 3, and retaining like index numbers where appropriate. Assume that transmitting station configuration is determined by upper RLC layers such that the following five poll triggers are enabled:

(1) "Last PDU in buffer (for first time transmission)";
(2) "Last PDU in Retransmission buffer";
(3) "Poll timer" (with Timer_Poll=200 ms);
(4) "Every Poll_PDU PDU" (with Poll_PDU=4); and
(5) "Every Poll_SDU SDU" (with Poll_SDU=4).

Assume also that the 'Window based' trigger and 'Timer based' trigger are disabled, that the poll prohibit function is configured with Timer_Poll_Prohibit=250 ms, that one SDU is requested for transmission by an upper layer and an RLC transmission confirmation is requested by the upper layer when transmission of the SDU is positively acknowledged, and that the SDU is segmented into six PDUs.

The transmitting station 41 will transmit the six PDUs 400~405 (having sequential SNs: 0, 1, 2, 3, 4 and 5 for example) in sequence. When scheduling the fourth PDU 403 (SN=3) for transmission, the "Every Poll_PDU PDU" poll trigger will be activated and poll bit of the fourth PDU consequently set. The Timer_Poll 45 (200 ms) and Timer_Poll_Prohibit 43 (250 ms) functions are commenced simultaneously when PDU 403 (SN=3) is transmitted via lower layers. The transmitter continues to schedule the fifth (SN=4) and sixth (SN=5) PDUs, 404 & 405 respectively, for transmission. When PDU 405 (SN=5) is transmitted, the "Last PDU in buffer" trigger is activated since there are no more PDUs to be transmitted, however, the poll trigger 48 is delayed because the poll prohibit function (Timer_Poll_Prohibit), according to the prior art, is still in effect, hence the sixth and last PDU 405 is transmitted without its poll bit set. Suppose that the third PDU 402 (SN=2) is lost during radio transmission. When the receiving station receives the fourth PDU (which has its poll bit set), the receiving station accordingly transmits a status report 406, in this case to positively acknowledge that PDUs having SN values 0, 1 and 3, i.e. PDUs 400, 401 and 403 have been received successfully, but negatively acknowledging PDU 402 (SN=2). Suppose that the status report 406 is lost during radio transmission.

At a time 46, the Timer_Poll function 45 completes its countdown, however, because Timer_Poll_Prohibit 43 is still active, a poll trigger 49 that would otherwise be issued by the Timer_Poll function 45 is also delayed. When Timer_Poll_Prohibit 43 expires at a time 44, even though there are two active delayed poll triggers (48 and 49), only one poll is issued and sent with a PDU 402a, which is a re-transmission of a selected PDU 400 (SN=0) that has not yet been acknowledged yet (because the status report is lost). Upon receiving the PDU 402a, the receiving station 42 responds by transmitting a status report 407 to the transmitting station 41 to positively acknowledge PDUs having SN 0, 1, 3, 4 and 5 and to negatively acknowledge PDU having SN 2. The prior art method can then retransmit the PDU 402 (SN=2) with its poll bit set (not shown in FIG. 5) and proceed smoothly in this case.

In FIG. 5, wherein there were no negatively acknowledged PDUs nor further SDUs requiring transmission and polling is not prohibited after Timer_Poll_Prohibit expires, the 'timer based' initiated poll would be sent with a re-transmission of a suitable PDU as described in Steps 1008, 1009 and 1016 in FIG. 4. The suitable PDU can be a PDU with SN=VT(S)−1, i.e. the sequentially last PDU that had been transmitted at least once (for example, PDU 405 in FIG. 5). VT(S) is a 'send state' variable that is maintained by the transmitting station; it is incremented (by one) each time a PDU is transmitted for the first time, however, it is not incremented if a PDU is re-transmitted.

In addition to the SN=VT(S)−1 PDU, in cases where "Configured_TX_Window_Size" is less than 2048, i.e. half the amount of different numbers that can be represented by a 12-bit SN, any PDU that has not yet been acknowledged (for example, PDUs 400, 401, 402, 403 and 404 in FIG. 5) can be selected as the suitable PDU and scheduled for retransmission in order to carry the poll. 'Transmission window size' relates to parameters for the maximum number of PDUs, (in effect, a window size), that the transmitting station can transmit (and that the receiving station can receive) without receiving some form of status message from the receiving station. Again, the upper layers configure this parameter.

Unfortunately, there are situations allowable in the prior art whereby 'deadlock' may arise. Please consider the following example, which assumes the same initial conditions as the example shown by FIG. 5 above, i.e. that a transmitter is configured by upper layers to enable the following five poll triggers:

(1) "Last PDU in buffer (for first time transmission)";
(2) "Last PDU in Retransmission buffer";
(3) "Poll timer" (with Timer_Poll=200 ms);
(4) "Every Poll_PDU PDU" (with Poll_PDU=4); and
(5) "Every Poll_SDU SDU" (with Poll_SDU=4).

Again, as for the example shown by FIG. 5 above, assume also that the 'Window based' trigger and 'Timer based' trigger are disabled, that the poll prohibit function is configured with Timer_Poll_Prohibit=250 ms, that one SDU is requested for transmission by an upper layer and an RLC transmission confirmation is requested by the upper layer when transmission of the SDU is positively acknowledged, and that the SDU is segmented into six PDUs.

Please refer to FIG. 6, which illustrates the present example. The transactions between the transmitting station 41 and the receiving station 42 are identical to the example shown by FIG. 5 regarding the initial transmission of PDUs 400~405, except that in this example the status report 406 positively acknowledges PDUs 400~403 (SNs 0~3) and the transmitting station 41 receives the status report successfully. According to the prior art, this has the affect of cancelling the Timer_Poll function 45 at a time 47, and although a "Last PDU in buffer" poll trigger delayed until a time 44, no PDU will be scheduled for transmission/re-transmission. This is because, in this case, there are no more SDUs (and hence, no more PDUs) to be transmitted, no negatively acknowledged PDUs to be re-transmitted, and a PDU with SN=VT(S)−1 may only be scheduled when a poll delayed by Timer_Poll_Prohibit is initiated by 'poll timer' or 'timer based' functions according to Steps 1006 and 1007 in FIG. 4. As the Timer_Poll function 45 is cancelled and no timer based function is configured, these conditions can not be met, and hence according to the prior art set forth by 3GPP TS 25.322 or by FIG. 4 above, the transmitting station 41 will remain idle following receipt of the abovementioned status report 406, without scheduling any PDUs for transmission or retransmission, i.e. there is no further traffic with which to transmit a poll. Without a status report acknowledging the successful receipt of the fifth and sixth PDUs, RLC transmission confirmation cannot be sent to the upper layers, consequently RLC layers at both the transmitter and the receiver stations cannot proceed to any further operations, i.e. the RLC layers are deadlocked.

There is a need then for a method which, when implemented in a 3GPP radio communications system, will circumvent the abovementioned RLC layer deadlock situation.

SUMMARY OF THE INVENTION

A method of polling in a wireless communications system includes prohibiting polling within a predetermined period and triggering a poll function while polling is prohibited, wherein the poll function is triggered by an "every predetermined number of PDUs" trigger that triggers the poll function when every predetermined number of PDUs are scheduled for transmission or re-transmission. After the predetermined period has expired the method determines that there are no protocol data units (PDUs) scheduled for transmission or re-transmission, and selects a PDU to schedule for re-transmission to fulfill the triggered poll function.

These and other objectives of the present invention will no doubt become obvious to those of ordinary skill in the art after reading the following detailed description of the preferred embodiment that is illustrated in the various figures and drawings.

DETAILED DESCRIPTION

In order to overcome the prior art problems described above, a preferred embodiment method of the present invention is described by example below.

Figure 5:
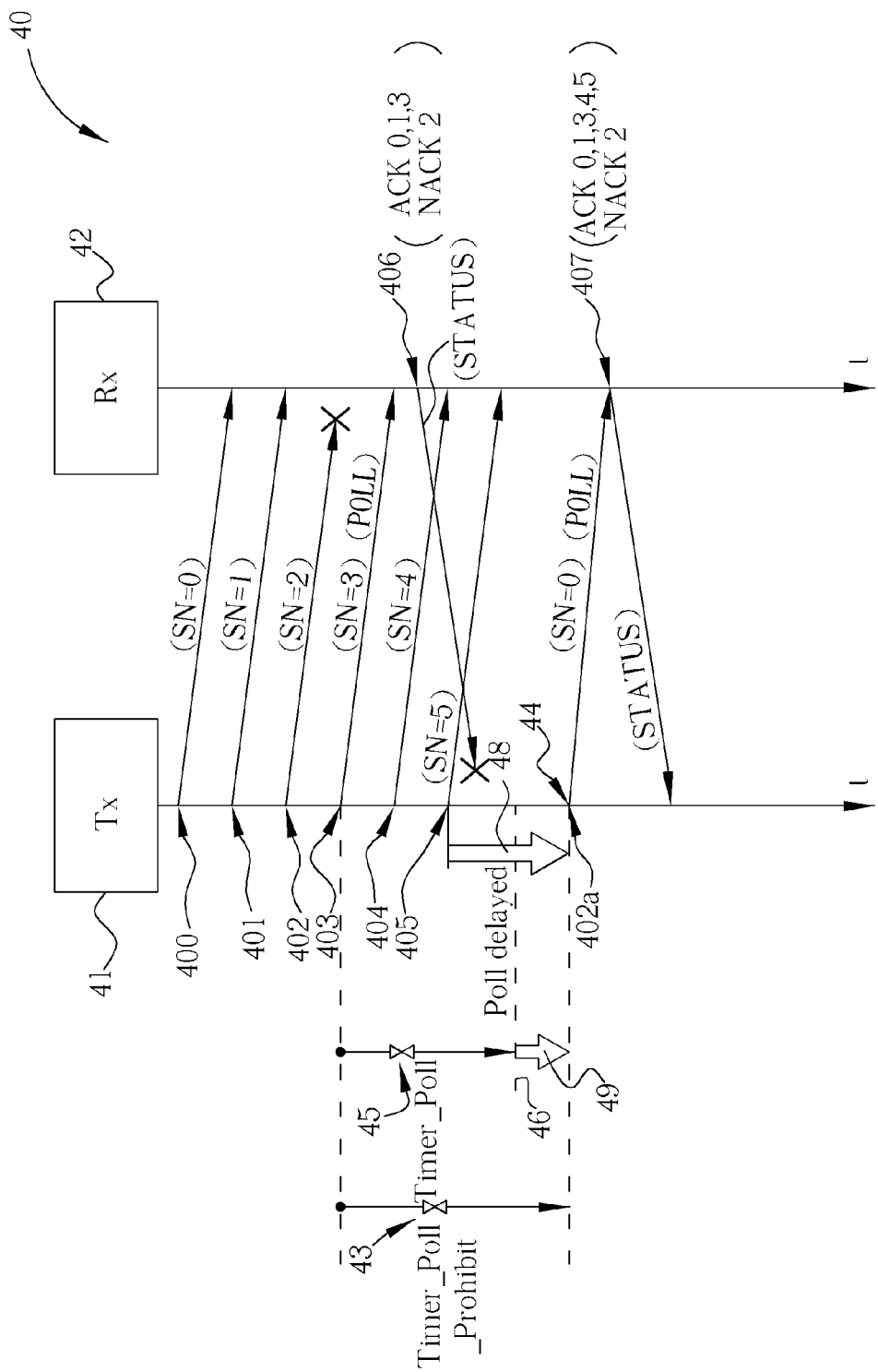
FIG. 5 is a message sequence chart representing AMD PDU transfer between a transmitting station and a receiving station according to the prior art.
Figure 6:
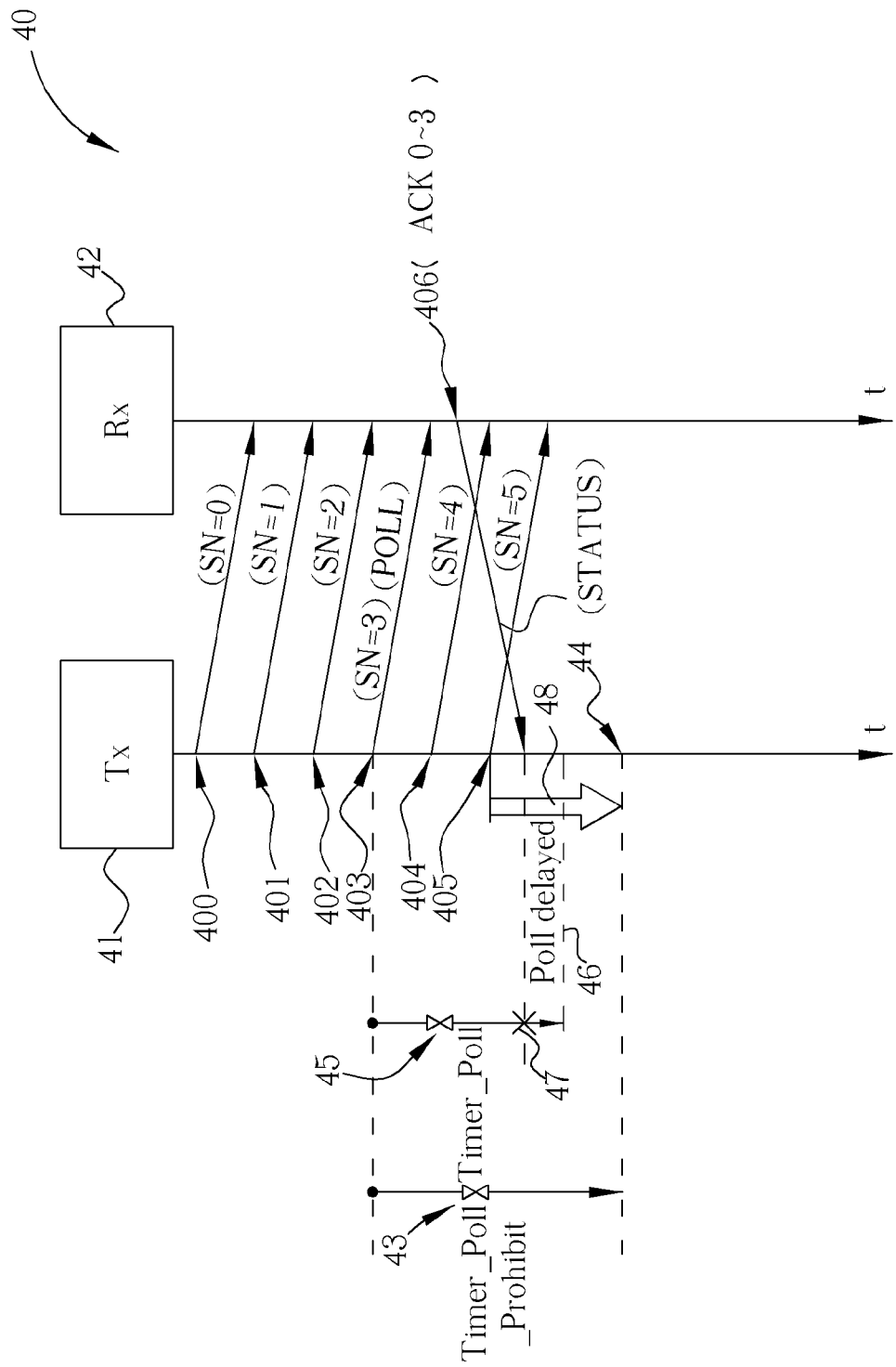
FIG. 6 is a message sequence chart representing an example of deadlock in a wireless communications system according to the prior art.

Assuming the configuration of the transmitting and the receiving stations is the same as that given in the prior art examples illustrated by FIGS. 5 and 6 above, i.e. the transmitter is configured by upper layers to enable the following five poll triggers:
(1) "Last PDU in buffer (for first time transmission)",
(2) "Last PDU in Retransmission buffer",
(3) "Poll timer" (with Timer_Poll=200 ms),
(4) "Every Poll_PDU PDU" (with Poll_PDU=4), and
(5) "Every Poll_SDU SDU" (with Poll_SDU=4).

And also assuming that: 'window based' triggers and 'timer based' triggers are disabled, the poll prohibit function is configured with Timer_Poll_Prohibit=250 ms, one SDU is requested for transmission by an upper layer and an RLC transmission confirmation is requested by the upper layer when transmission of the SDU is positively acknowledged, and that the SDU is segmented into eight PDUs (having sequential SNs: 0, 1, 2, 3, 4, 5, 6 and 7).

Figure 7:
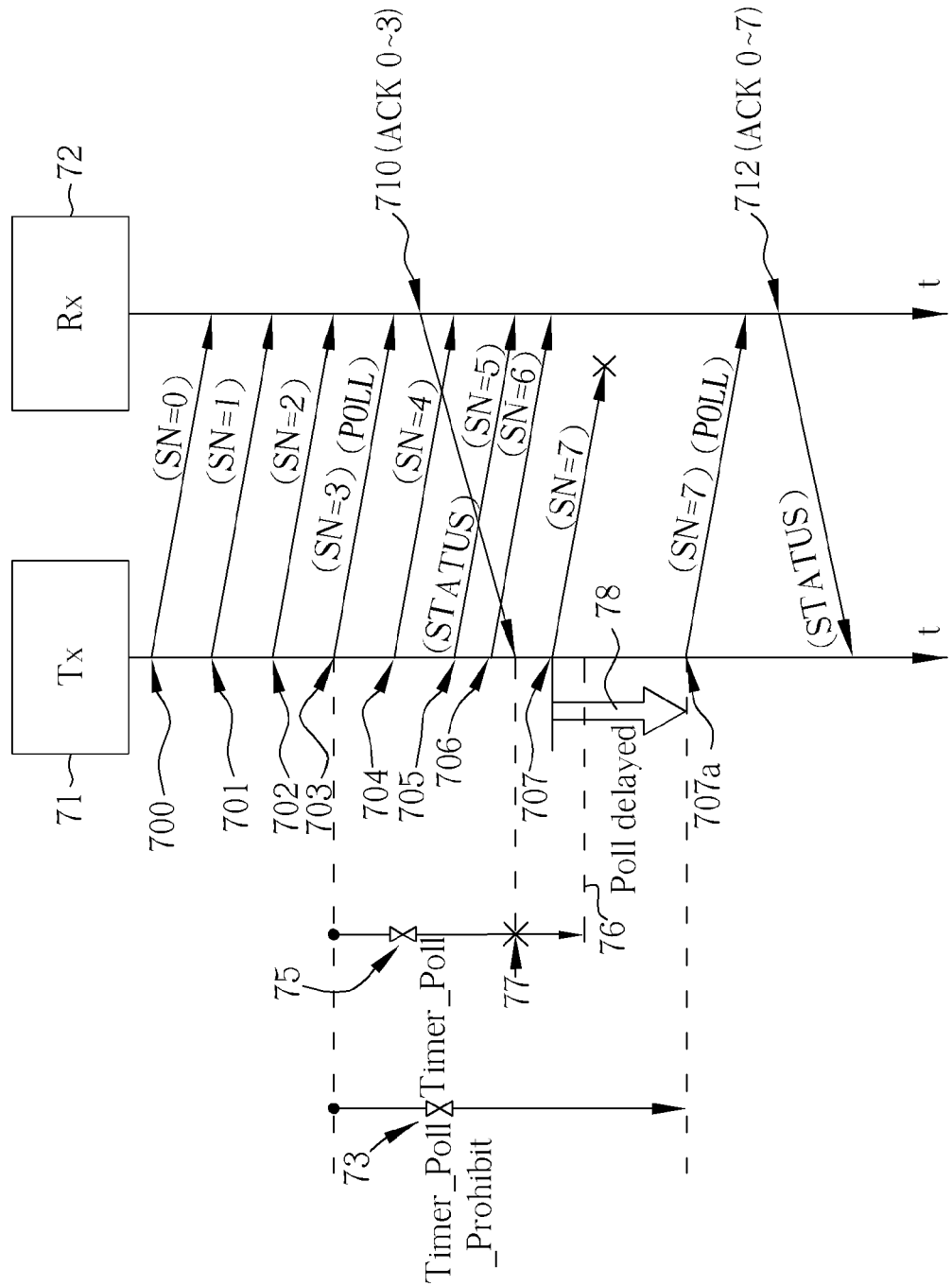
FIG. 7 is a message sequence chart representing a preferred embodiment method of AMD PDU transfer according to the present invention.

In the example illustrated by FIG. 7, the receiving station 72 successfully receives all four PDUs 700~703 (SN=0~3) wherein the fourth PDU 703 (SN=3) is received with a poll, and sends a status PDU 710 positively acknowledging the PDUs having SNs=0~3. The transmitting station 71 receives this status report 710 successfully at a time 77 before the current instance of the Timer_Poll function 75 expires, thereby canceling the Timer_Poll function 75, thus no poll is issued at the time 76 when the Timer_Poll function 75 countdown was due to expire. When the transmitting station 71 transmits the PDU 707 having SN=7, a poll is triggered by the "Every Poll_PDU PDU", wherein Poll_PDU is configured to be 4, but this poll is delayed because poll is prohibited when the PDU 707 is sent out. However, when the Timer_Poll_Prohibit function 73 expires, the transmitting station 71 finds that a delayed poll 78 (having been triggered by a "Every Poll_PDU PDU" trigger when PDU 707 (SN=7) was scheduled for transmission, but not sent because the Timer_Poll_Prohibit function 73 was still active) is awaiting transmission. There are no more PDUs scheduled for transmission or re-transmission, and under the prior art scheme, no PDU can be scheduled because the relevant poll was not triggered by a "Poll Timer" or "Timer based" function (Step 1007 in FIG. 4). Note also that, because the existing Timer_Poll function 75 is canceled by the status report 710, there is no likelihood of a suitable poll trigger occurring due to the "Poll timer" function. Hence, in the method of the present invention, upon expiration of the Timer_Poll_Prohibit function 73, the type of the relevant poll is checked, i.e. whether the relevant poll is triggered by the "Every Poll_PDU PDU" trigger. In this example, the test will be positive and, according to the present invention method, the transmitting station 71 will re-transmit a suitable PDU 707a, which can be the last PDU 707 (SN=7), this being the current SN=VT(S)−1 PDU with poll bit set. When the receiving station 72 receives the re-transmission of the PDU 707 (SN=7), i.e., the PDU 707a, this time including a poll, the receiving station 72 will send a status report 712 to positively acknowledge the successful receipt of all PDUs up to and including SN=7. Upon receiving the status report 712, the transmitting station 71 can send confirmation of SDU receipt to the upper layer (not shown in FIG. 7) so that the upper layer can proceed to subsequent processes, thus avoiding the deadlock situation inevitable under the prior art scheme. Thus, employing the method of the current invention can circumvent the deadlock shown to occur when the prior art method is applied to such a scenario.

Figure 1:
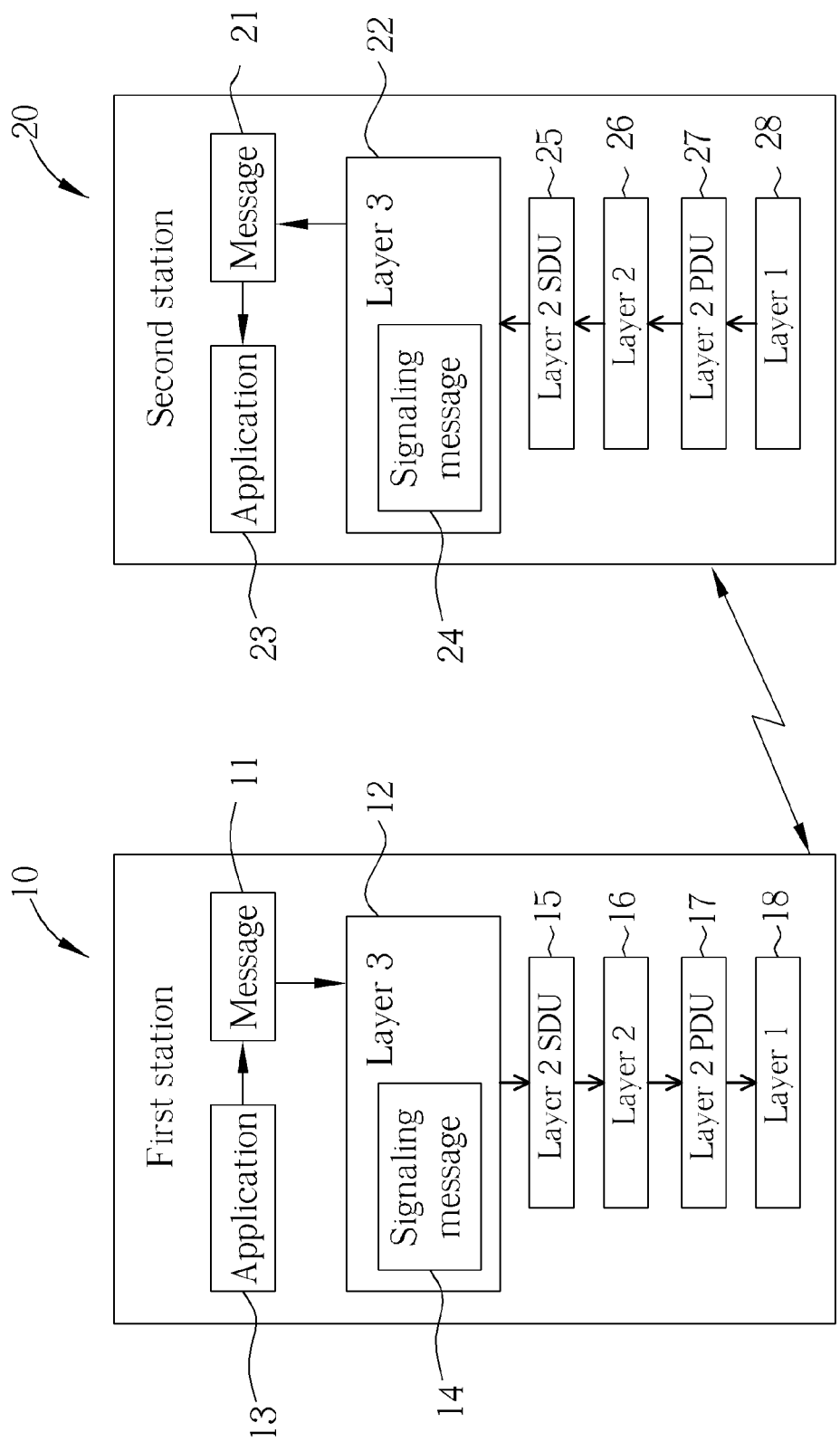
FIG. 1 is a block diagram of the three layers typical of a communications system according to the 3$^{rd}$ Generation Partnership Project (3GPP™) communications protocol.
Figure 2:
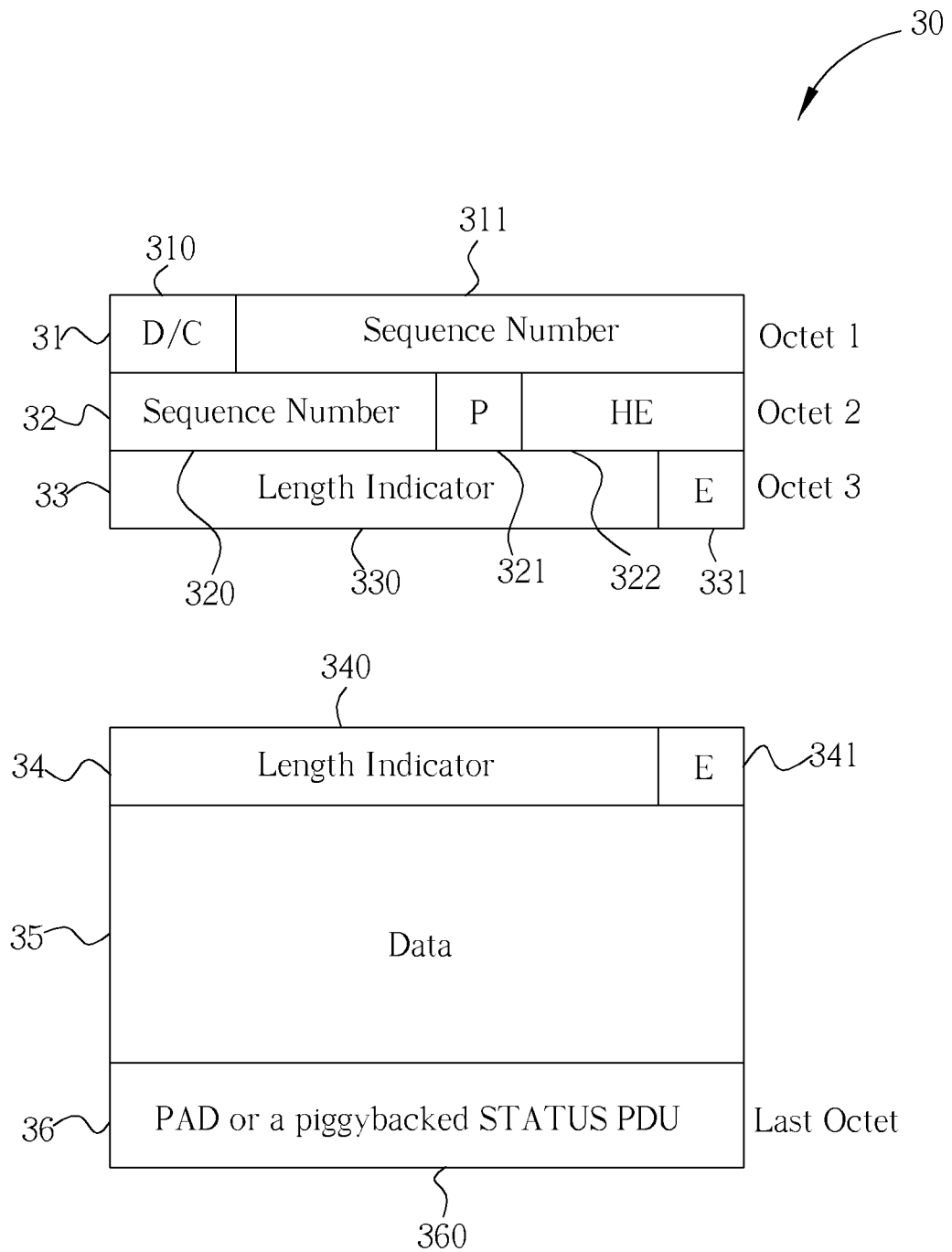
FIG. 2 is a block diagram showing an example of an acknowledged mode data protocol data unit (AMD PDU) according to the prior art.
Figure 3:
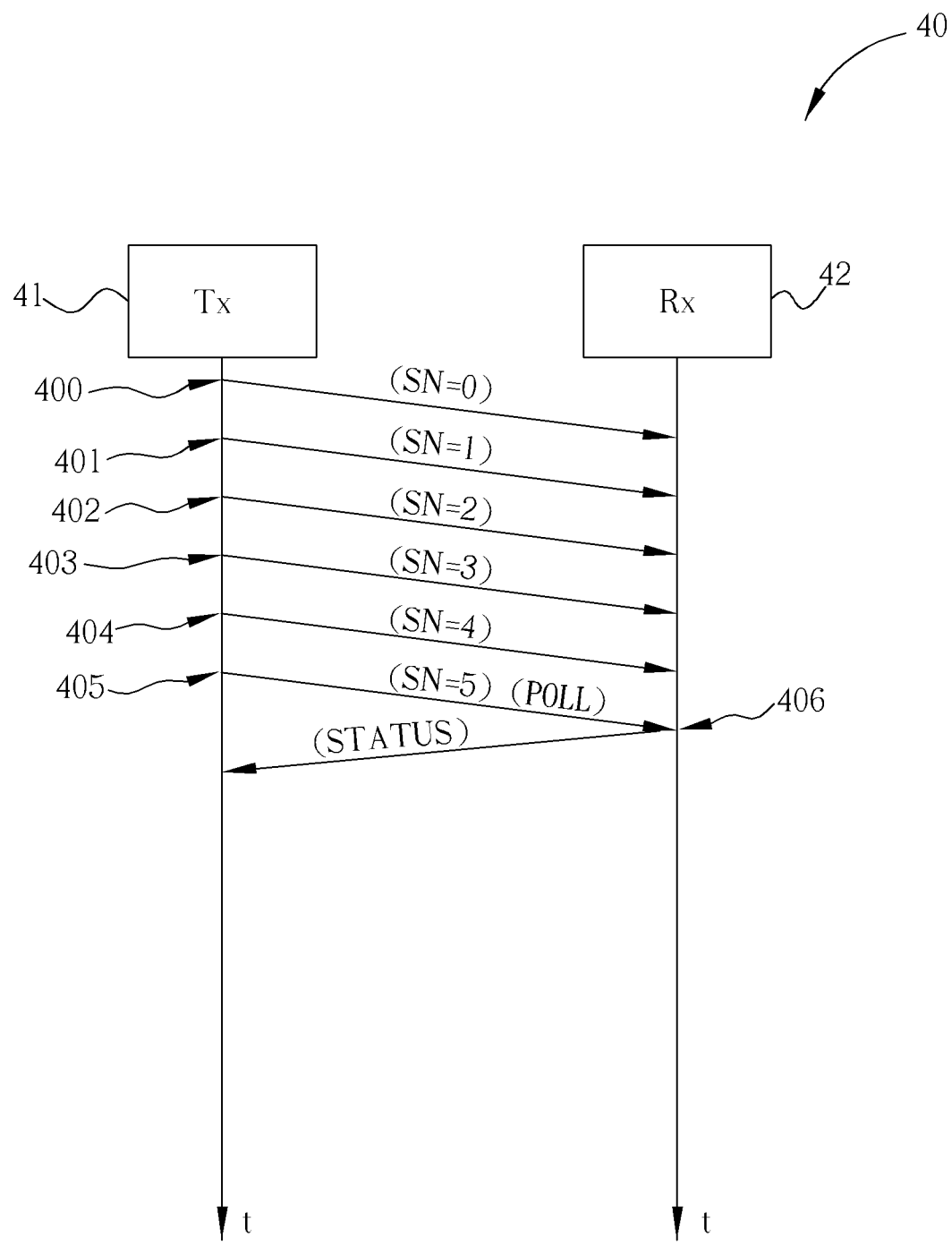
FIG. 3 is a message sequence chart representing AMD PDU transfer between a transmitting station and a receiving station according to the prior art.
Figure 4:
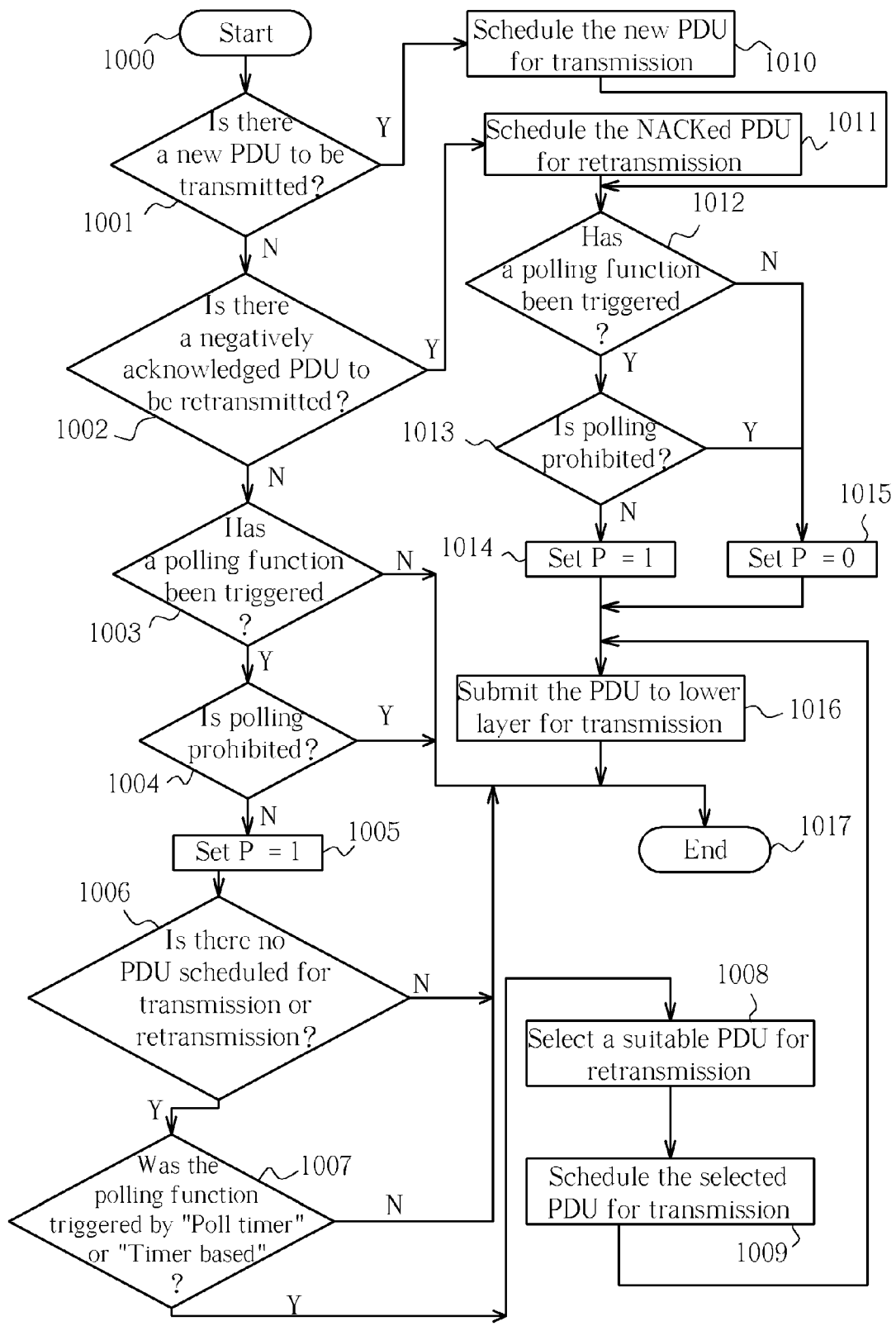
FIG. 4 is a flow diagram of the polling process according to the prior art.
Figure 8:
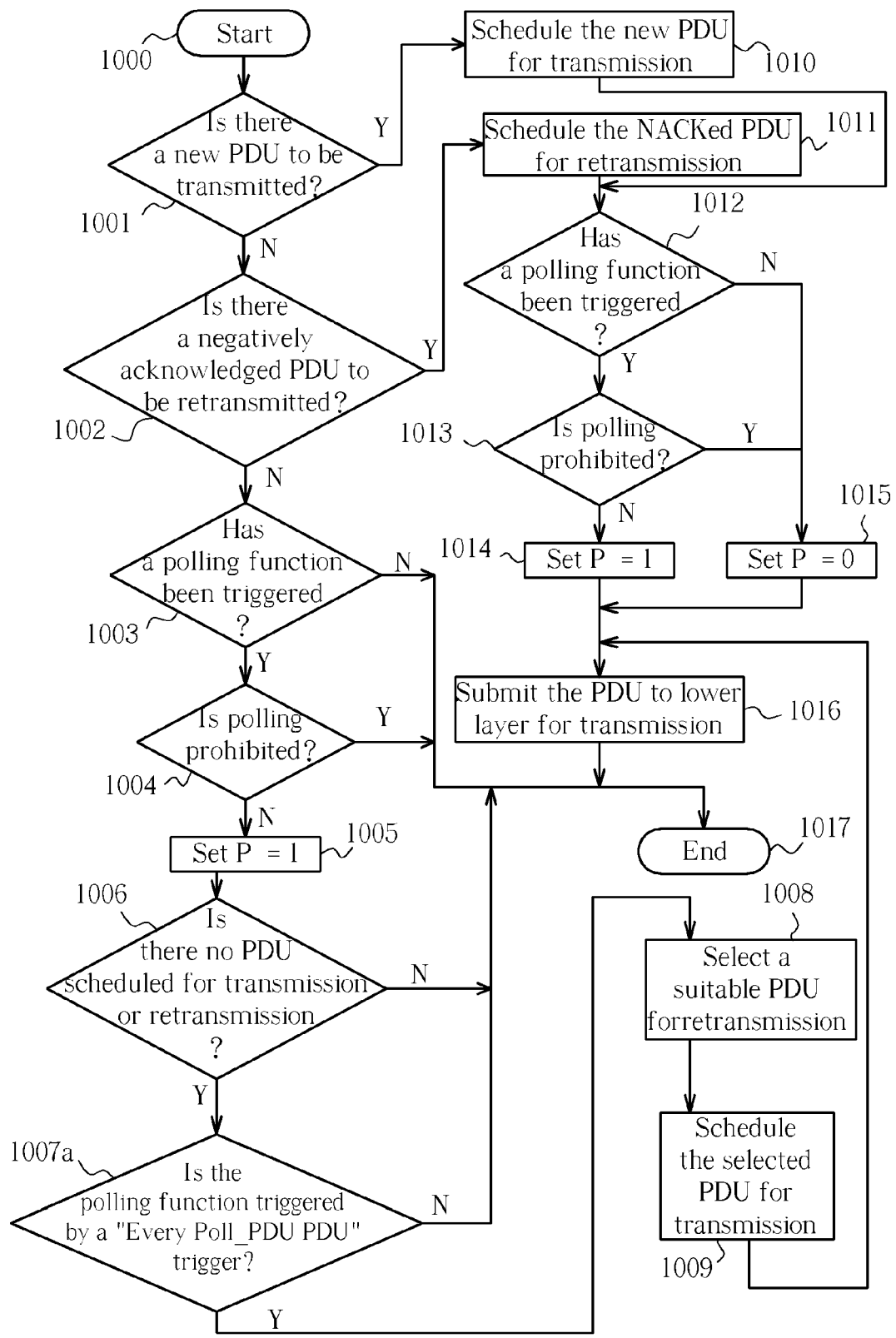
FIG. 8 is a flow diagram of a preferred embodiment of the present invention method.

The present invention method can be implemented as software or firmware in a wireless communications system, incorporated in the architecture of, for example, a monolithic communications microchip for use in the same, or realized in the structure of supporting discrete or programmable logic device(s). The present invention method can be summarized in the following process (FIG. 8 refers):

In FIG. 8, Step 1007 is FIG. 4 is replaced by 1007a. In other words, if the polling function checked at Step 1003 is triggered by the "Every Poll_PDU PDU" trigger, the system retransmits a suitable PDU to carry the poll bit. Only Step 1007a is described below since all the other steps are exactly the same as those in FIG. 4.

Step 1007a: The system checks if the polling function was triggered by a "Every Poll_PDU PDU" trigger. If the checking result is yes, the process proceeds to Step 1008. Otherwise, the process terminates via Step 1017.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of polling in a wireless communications system that employs protocol data units (PDUs) and service data units (SDUs), the method comprising:
  prohibiting polling within a first predetermined period;
  activating a poll function trigger while polling is prohibited, wherein the poll function trigger is an "Every Poll PDU PDU" trigger that is activated when every predetermined number of PDUs are scheduled for transmission or re-transmission; and
  after the first predetermined period has expired, determining that there are no PDUs scheduled for transmission or re-transmission and that there is at least a transmitted PDU that is not acknowledged yet;
  selecting a PDU to schedule for re-transmission to fulfill the poll function;
  wherein there is no poll function activated by a Poll timer trigger during the first predetermined period;
  wherein there is no poll function activated by a Timer based trigger during the first predetermined period;
  wherein the Poll timer trigger is defined as an event that activates a poll function when a second predetermined period has elapsed following an initiation of a poll being sent out; and
  wherein the Timer based trigger is defined as an event that activates a poll function periodically.

2. The method of claim 1, wherein the selected PDU is a PDU that is sequentially last PDU that has been transmitted at least once.

3. The method of claim 1, wherein the selected PDU is a PDU that has been transmitted but not yet acknowledged when a transmission window size is less than half the value of a space of sequence numbers of PDUs in the communications system.

* * * * *